Figure 1:
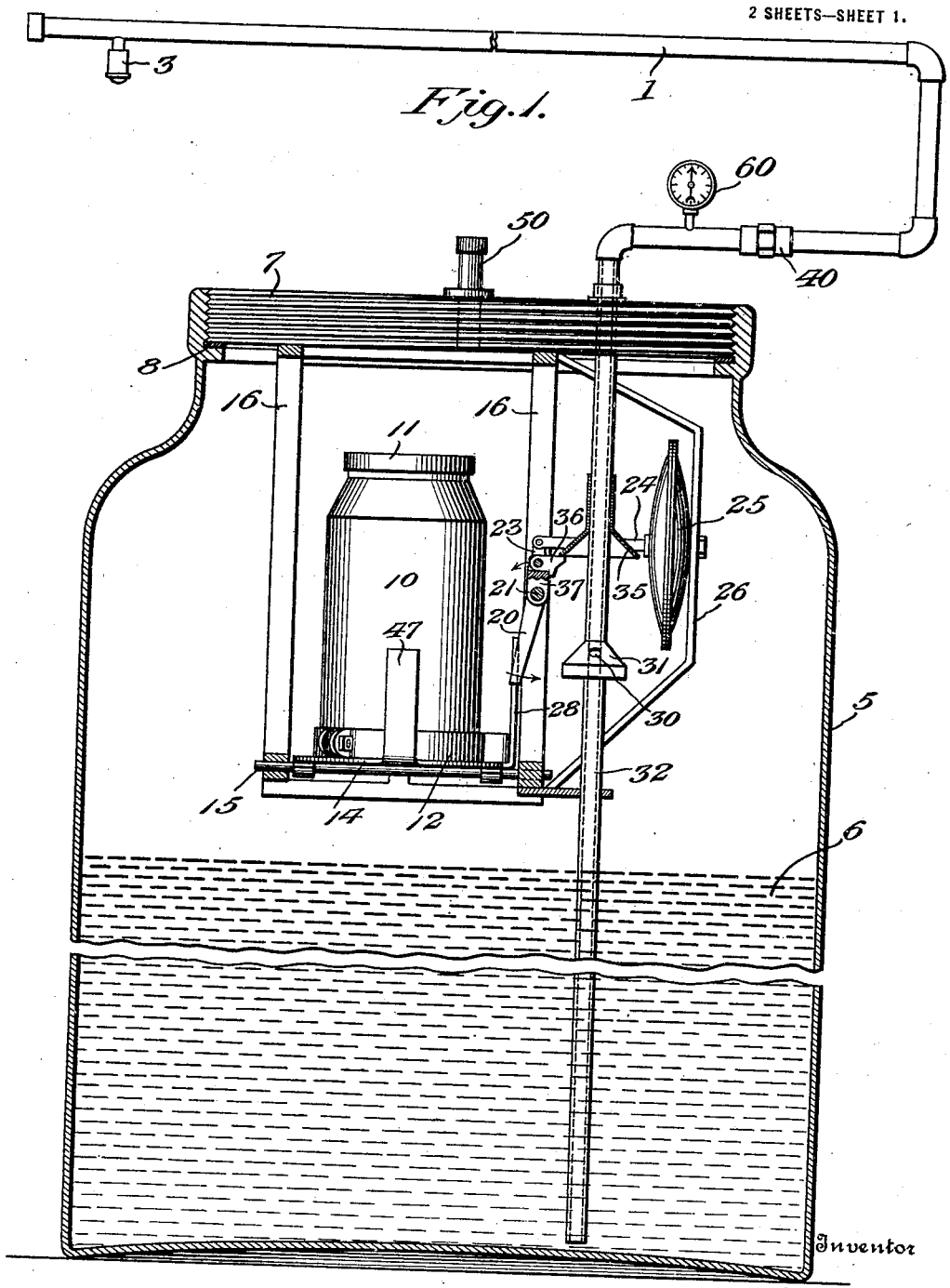

B. E. MOTT.
AUTOMATIC FIRE EXTINGUISHER.
APPLICATION FILED AUG. 31, 1918.

1,319,965.

Patented Oct. 28, 1919.
2 SHEETS—SHEET 1.

Inventor
B. E. Mott
By
Eugene C. Brown
Attorney

B. E. MOTT.
AUTOMATIC FIRE EXTINGUISHER.
APPLICATION FILED AUG. 31, 1918.
1,319,965.
Patented Oct. 28, 1919.
2 SHEETS—SHEET 2.
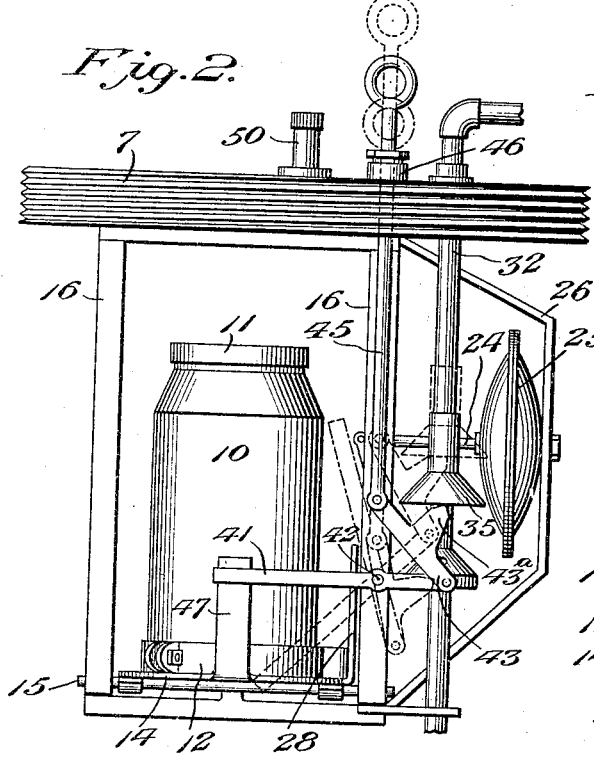
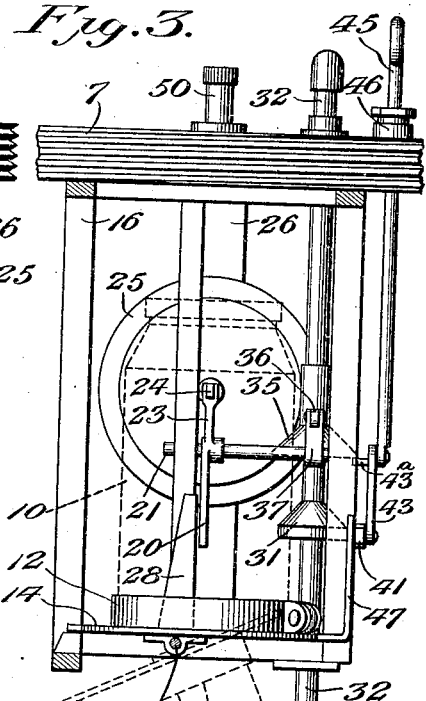
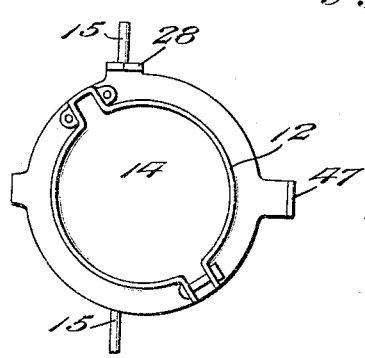
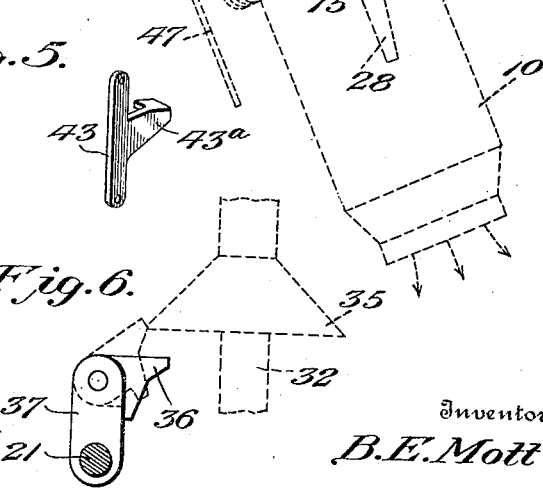
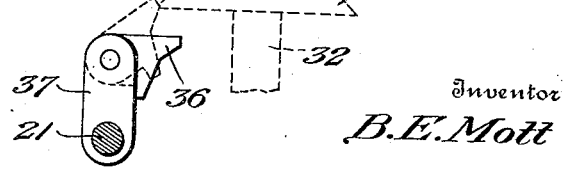
Inventor
B. E. Mott
By Eugene C. Brown
Attorney

UNITED STATES PATENT OFFICE.

BALDWIN E. MOTT, OF SAN FRANCISCO, CALIFORNIA.

AUTOMATIC FIRE-EXTINGUISHER.

1,319,965.  Specification of Letters Patent.  Patented Oct. 28, 1919.

Application filed August 31, 1918. Serial No. 252,213.

*To all whom it may concern:*

Be it known that I, BALDWIN E. MOTT, a citizen of the United States, residing at San Francisco, in the county of San Francisco and State of California, have invented certain new and useful Improvements in Automatic Fire-Extinguishers, of which the following is a specification.

This invention relates to automatic fire-extinguishing apparatus in which a distributing system of pipes provided with automatic sprinkler heads, hose connections or other distributing devices, extends through the buildings or apartments to be protected, the distributing system being connected to a generating tank or chamber in which the liquids and chemicals are mixed to form the fire extinguishing fluid. The entire system is maintained under pressure control and automatically regulates the generation of the fire-extinguishing fluid upon a change in the pressure brought about by the opening of one of the vents.

The main object of my invention is to provide an improved gas-generating apparatus under the control of a pressure cell which controls the discharge of the acid contents of a vessel into the alkaline solution in the generating tank and simultaneously closes a valve connecting the distributing system with the pressure chamber of the generating tank so that the gas immediately generated shall force the fire-extinguishing liquid through the same system of distributing pipes. It is the purpose of my invention to so arrange the pressure cell controlled mechanism as to insure absolute certainty of operation.

My invention will be understood from the following description in connection with the accompanying drawings in which—Figure 1 is a vertical sectional view of a generating tank and showing a pressure controlled mechanism embodying my invention; Figs. 2 and 3 are respectively side and end elevations of the pressure cell control mechanism; and Figs. 4, 5 and 6 are enlarged detailed views of certain of the parts hereinafter mentioned.

The distributing system may be of any desired type comprising any desired number of distributing pipes 1 extending throughout the building and provided with automatic sprinkling heads or vents 3 suitably located and which may be of the thermal type, controlled by a fusible element which melts at a low temperature, as is well understood. The generating tank 5 may contain any suitable alkaline solution 6, such as sodium carbonate and may also, if desired, contain suitable inert salts to reduce the freezing point of the liquid for low temperature service. The cover 7 is secured in a manner to produce a gas-tight joint and may be screw threaded therein, fitting tightly upon a gasket 8. The acid containing vessel 10 is provided with a loose cover 11 and is secured to a tiltable table or shelf 14 by means of a clamping band 12 secured to the shelf, the latter being eccentrically pivoted upon the shaft 15 which is carried by the standards 16 of a supporting cage depending from the cover.

The tripping mechanism which normally holds the table 14 in horizontal position comprises the dog 20 carried by the rock shaft 21 which carries an upwardly extending arm 23 to which is pivotally connected a link 24 secured at its outer end to the wall or diaphragm of the pressure cell 25, the latter being supported upon a frame 26 secured to the cage. When the parts are in their "set" position shown in Figs. 1 and 3, the pressure-cell is contracted by the compressed air in the upper portion of the tank and maintains the rock-shaft 21 in the position shown, so that the dog 20 stands in front of the arm 28, which extends upwardly from the tilting table 14, thereby acting as a stop to maintain the table in horizontal position. When the air pressure in the tank and distributing system is reduced by the opening of one of the vents 3, the walls of the pressure-cell 25 expand outwardly, thereby rocking the shaft 21 in the direction indicated by the arrow in Fig. 1, which causes the dog 20 to move toward the right, thus releasing the holding arm 28 and permitting the eccentrically mounted table to overturn and drop the acid vessel 10 into the position shown in dotted lines in Fig. 3, thereby discharging the acid contents into the tank where it combines with the alkaline solution to generate carbonic acid gas, as is well understood.

When the parts are in their normal "set" position, indicated in Fig. 1, the distributing system is in direct communication with the air under compression in the upper part of the tank through the valve opening or port 30, which is located in the wall of a conical seat 31 rigidly secured to the pipe 32.

A conical valve or port cover 35 slidably mounted on the pipe 32 is held in raised position by the pivoted catch 36 carried by an arm 37, secured to the rock-shaft 21 and when the shaft is rocked by the expansion of the pressure cell 25 upon the release of air pressure in the system, the catch is removed from beneath the valve or port cover 35 simultaneously with the release of the dog 20 from the arm 28, thereby permitting the cover 35 to slide downwardly and close the valve opening or port 30. Communication is thus shut off between the upper air-chamber portion of the tank and the distributing pipes, thereby permitting the accumulation of gas generated in the tank until the pressure is sufficient to expel the liquid contents of the tank through the pipe 32, which extends nearly to the bottom of the tank.

In order to recharge the tank and acid cell and to reset the tripping mechanism, the cover 7 which carries said mechanism is removed, after first disconnecting the apparatus from the distributing system at the coupling joint 40. After filling the tank to the proper level with the alkaline solution, the tilting table 14 is manually turned into upright horizontal position and is held in this position while the acid vessel 10 is being refilled and while the cover is being lowered and replaced in the tank, by means of a lever 41 pivotally secured to one of the supporting standards 16 at 42, the inner end of the lever being connected by a link 43 to a manually controlled rod 45 which passes through a stuffing box 46 in the cover. The rod is lowered into the intermediate position indicated in solid lines in Fig. 2, thereby bringing the lever arm 41 into horizontal position in front of an arm 47 extending upwardly from the table 14.

After the cover has been secured in the tank and the outlet pipe 32 has been connected at the coupling 40 to the distributing system, the cap is removed from the inflation valve 50, which may be of the type usually employed in the air valves of pneumatic tires, etc., and the air in the tank and distributing system is placed under compression by means of an air pump, after which the cap is replaced on the valve 50. During this operation the valve cap 35 is held in an intermediate position by a lug 43ª on the link 43 as indicated in Fig. 2. The air in the upper portion of the tank having been placed under compression, the diaphragm of the pressure-cell 25 will be retracted, thereby rotating the rock shaft to the position shown in Fig. 1 with the dog 20 in the position to hold the arm 28 and prevent the table from tilting. The rod 45 is then moved upwardly into the upper dotted line position shown in Fig. 2 to thereby lift the valve cover 35 above the catch 36, the latter swinging on its pivot in the manner indicated in Fig. 6. When the rod 45 is lowered to its normal position indicated in the lower dotted lines in Fig. 2, the valve cover 35 will rest upon the catch 36 and the lever 41 will be swung upwardly until it is out of the way of the movement of the arm 28, when the dog 20 is tripped, the lug 43ª occupying a position slightly below the conical seat 31 so that it will not interfere with the closing of the valve opening 30 when the valve cover 35 is permitted to drop thereon. When the cover has been removed for the purpose of refilling the tank and acid vessel, and the latter has been swung upwardly into normal position, as the rod 45 is moved downwardly into the intermediate position shown in dotted lines in Fig. 2, for the purpose of bringing the arm 41 into position to hold the arm 47, the lug 43ª will engage the bottom edge of the valve cover 35 and move it upwardly into the intermediate position shown in Fig. 2. The parts are held in this position as previously described, until after the cover has been sealed in the top of the tank and the air has been placed under compression.

The operation of my automatic fire-extinguishing apparatus will be understood from the foregoing detailed description of the parts. When the tank and acid cell have been filled and the parts placed in the "set" position shown in Fig. 1, they will remain inert for an indefinite period. The pressure in the distributing system can be determined at any time by means of a pressure-gage 60. Whenever one of the automatic fusible sprinkler vents is opened by being subjected to an abnormal degree of heat, the pressure in the system will be instantly relieved thereby causing the pressure-cell to expand and actuate the tripping mechanism which releases the tilting table and permits the acid in the jar or vessel 10 to be discharged into the alkaline contents of the tank. The tripping mechanism simultaneously releases the valve cover 35 which closes the communication between the air chamber in the upper part of the tank and the distributing system, thereby permitting the accumulation of the gas pressure and the discharge of the gas and liquid contents through the pipe 32 and the distributing pipes to the sprinkling vents 3 which have been opened by the action of the heat in the compartments which have been endangered by the presence of fire.

I have described in detail the particular construction illustrated in the accompanying drawings for the purpose of disclosing an embodiment of my invention, but it is evident that various changes and modifications may be made therein within the scope of my claims and without departing from my invention. It is evident that instead of maintaining the system under compression, I may reduce the pressure below normal atmospheric pressure by merely changing connection of the pressure cell so that it will operate to rock the shaft 21 upon a change from the normal condition. I therefore wish it to be understood that the pressure cell may be actuated either by super-atmospheric pressure or by sub-atmospheric pressure and that the term "air pressure" refers to either condition.

I claim:—

1. In an automatic fire-extinguishing apparatus wherein a generating tank is partially filled with an alkaline solution leaving an upper air space or chamber, and provided with an acid-containing vessel carried by a tiltable support in the air space and a discharge pipe extending into the solution adjacent the bottom of the tank is connected with a distributing pipe system provided with thermally controlled vents, the combination with said support, of a movable stop device adapted to hold the support and prevent it from overturning, a pressure cell within said air space and operatively connected to said stop, a port opening into the discharge pipe within the air space in the tank and a movably mounted cover normally held by said stop device and adapted to close said port when said stop device is released by the operation of said pressure cell.

2. In an automatic fire-extinguishing apparatus wherein a generating tank is partially filled with an alkaline solution leaving an upper air space or chamber, and provided with an acid-containing vessel carried by a tiltable support in the air space and a discharge pipe extending into the solution adjacent the bottom of the tank is connected with a distributing pipe system provided with thermally controlled vents, the combination with said support of pressure controlled tripping mechanism therefor, a port normally connecting said discharge pipe with the air space in the tank and means controlled by said tripping mechanism for closing said port.

3. In an apparatus as specified in claim 2, a manually controlled device for holding the tiltable support until the tripping mechanism is under the control of the air pressure in the system.

4. An apparatus as specified in claim 3, wherein the manually controlled device also sets the port cover in open position.

In testimony whereof I affix my signature.

BALDWIN E. MOTT.

Copies of this patent may be obtained for five cents each, by addressing the "Commissioner of Patents, Washington, D. C."